H. ANTHONY.
TREADLES FOR FOOT POWERS.
No. 174,933. Patented March 21, 1876.
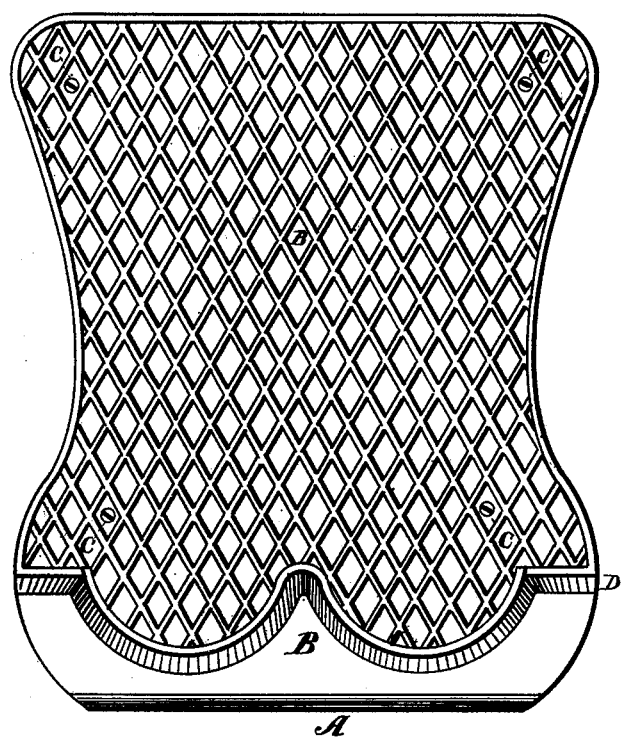
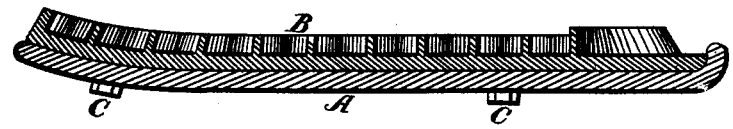
WITNESSES
E. J. Nottingham
Albert W. Bright
INVENTOR
Herman Anthony.
By Leggett and Leggett,
Attorneys.

UNITED STATES PATENT OFFICE.

HERMAN ANTHONY, OF CLEVELAND, OHIO.

IMPROVEMENT IN TREADLES FOR FOOT-POWERS.

Specification forming part of Letters Patent No. 174,933, dated March 21, 1876; application filed March 4, 1876.

*To all whom it may concern:*

Be it known that I, HERMAN ANTHONY, of Cleveland, in the county of Cuyahoga and State of Ohio, have invented certain new and useful Improvements in Treadles for Foot-Powers; and I do hereby declare the following to be a full, clear, and exact description of the invention, such as will enable others skilled in the art to which it pertains to make and use it, reference being had to the accompanying drawings, which form part of this specification.

My invention relates to an improvement in treadles for foot-powers, designed and adapted more particularly for sewing-machines, though applicable to all foot-powers.

My invention consists in an elastic rubber foot-pad formed with flexible curved heel-flanges.

In the drawing, Figure 1 is a plan view of a treadle embodying my invention. Fig. 2 is a longitudinal section of same.

A is the foot-treadle, of any ordinary construction, the particular construction of the treadle itself forming no part of my invention. B is a single or a double foot-pad, of soft rubber or its equivalent, provided with heel-flanges D. C are screws or clamps by which the rubber foot-pad is attached to the treadle.

Heretofore treadles have been made with a solid hard surface for the foot or feet to rest upon. There are many objections to such a treadle. In the first place, especially if it be made of iron, the foot is quickly chilled, and the operator rendered uncomfortable thereby; secondly, where a hard surface is presented the friction between the foot and the treadle sufficient to operate the device must necessarily be made very considerable in order to prevent the foot from slipping forward when the toe is down, or from slipping backward when the heel is down, and the extra pressure required to produce this friction is laborious upon the operator; third, the hard surface quickly tires the foot, and with a person not habitually used to operating them renders the heel and the ball of the foot tender and sore in a very short time.

To obviate these difficulties is the object of my invention. The rubber or other soft and elastic substance is warm and comfortable to the foot, presents sufficient friction by simply the weight of the foot to prevent slipping, and by its elasticity removes the harsh action upon the ball and heel of the foot.

This treadle is alike applicable to sewing-machines or any other apparatus where foot-power is employed. It is also apparent that the foot-pad may be fastened by cement to the treadle; or it may be fastened by any suitable clamp C; or it might be held in place by battens, or by resting in a suitable recess. The particular method of fastening the rubber pad to the treadle forms no essential part of the invention.

I am aware that rubber foot-pads have heretofore been applied to sewing-machine treadles; hence I do not claim the matter broadly; but

What I claim is—

A foot-pad formed of elastic rubber and provided with elastic heel-flanges, substantially as and for the purpose described.

In testimony whereof I have signed my name to this specification in the presence of two subscribing witnesses.

HERMAN ANTHONY.

Witnesses:
 FRANCIS TOUMEY,
 EDWARD WALSH.